Patented Feb. 21, 1939

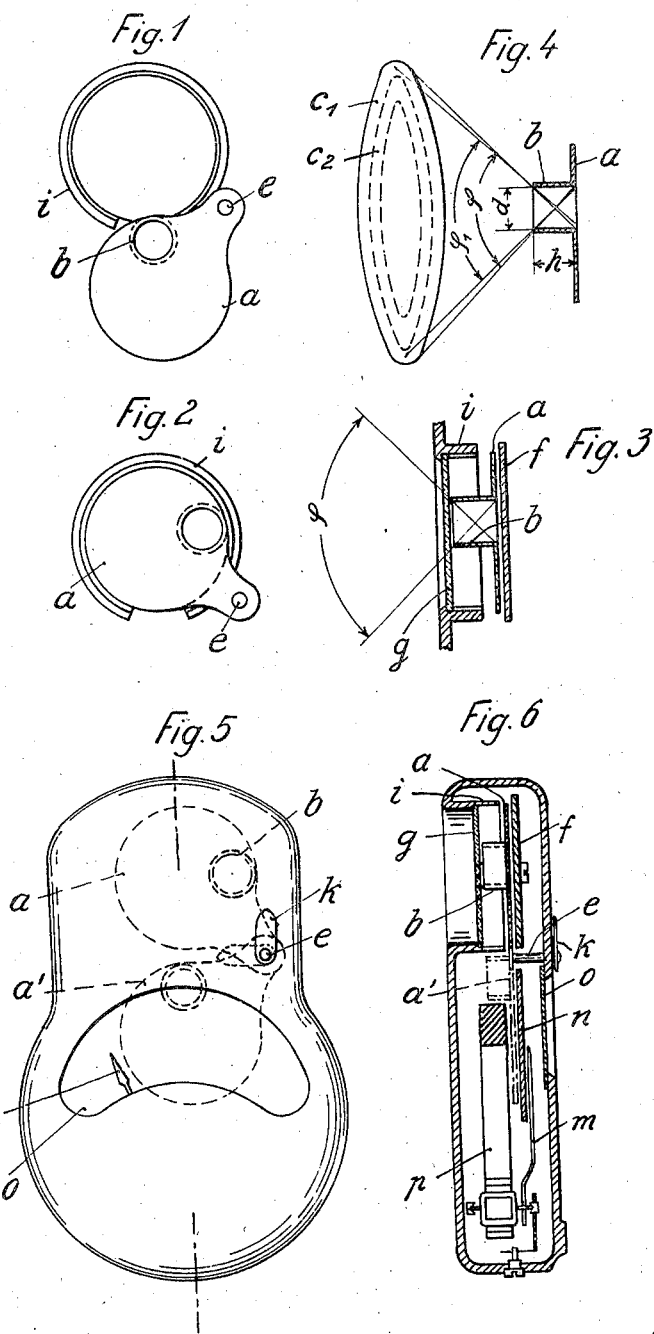

2,147,961

UNITED STATES PATENT OFFICE 2,147,961

PHOTOELECTRIC EXPOSURE METER

Albrecht Bernhard and Guido Beyrich, Nuremberg, Germany, assignors to Metrawatt Aktiengesellschaft Fabrik Elektrische Messgeraete, Nuremberg, Germany, a German company Application December 1, 1937, Serial No. 177,635
In Germany December 8, 1936

1 Claim. (Cl. 88—23)

This invention relates to a photoelectric exposure meter in which, for the purpose of altering the range of measurement, a rotatably mounted diaphragm is adapted to be rotated in front of the photoelectric element. The aperture of this diaphragm is so dimensioned that it reduces the beam of light falling on the element in a ratio corresponding to the desired variation in the range of measurement.

In the prior application, Ser. No. 98,396, is described a diaphragm of this kind which brings about not only a reduction of the beam of light but at the same time also a restriction of the angle of the cone of light. According to the invention of the prior application, the rotatable diaphragm is provided for the purpose with a flange projecting upwardly from the periphery of the diaphram aperture which may take the form of a tubular projection of circular or the like cross-section. According to the present invention, the diaphragm aperture is likewise provided with a tubular flange but the same is situated at the leading edge of the diaphragm, that is to say, at the edge which is the leading edge during the turning inwards of the diaphragm, in order that the space occupied by the surface of the diaphragm, in itself very thin, should be increased as little as possible in the turned-out position.

Figure 1 shows the diaphragm according to the invention in the turned-out position, and Figure 2 in the turned-in position.

Figure 3 is a section through the diaphragm and its tubular flange as well as through the light admission aperture of the exposure meter. Figure 4 is intended to illustrate the angles of image determined by the diaphragm.

Figures 5 and 6 show the arrangement of a diaphragm according to the invention in a photoelectric exposure meter. Figure 5 is a front elevation and Figure 6 is a sectional side view of the exposure meter.

In the drawing, $a$ is the diaphragm rotatably mounted at $e$, the aperture of which is completely surrounded by a tube $b$. The diaphragm is in front of the photoelectric element $f$ shown in Figure 3, so that in the turned-in position it obscures the beam of light passing through the protective disc $g$ and the tubular light admission opening $i$, with the exception of the part exposed by the diaphragm aperture.

The tube $b$ applied at the edge of the thin diaphragm results in the present case in a reduction of the image angle. If $h$ is the height of the tube and $d$ the inside diameter, the image angle $\varphi$ will be given by the following formula:

$$\tan \frac{\varphi}{2} = \frac{d}{h}$$

If for instance $h = d$, then $$\tan \frac{\varphi}{2} = 1,$$

that is to say $$\frac{\varphi}{2} = 45°$$

or $\varphi = 90°$.

By stating that the image angle is 90°, we mean that two diametrically opposite surface lines of the corresponding cone of light enclose 90°. The more acute this angle, the smaller will be the total of the incident light, as it varies in proportion to the area $c = c_1 + c_2 \ldots + c_n$ of the base of the cone of light (Figure 4).

It must be borne in mind that with the same density of illumination of the whole surface of the base of the light cone, the rays of light coming from the centre influence the element more intensely than those coming from the edge, because according to the well known cosine law, the area affected, with the incidence of light at a given angle, is proportional to the cosine of the angle of incidence in relation to the vertical axis. The size of the radiating surface is, with the same distance, proportional to $$\left(\tan \frac{\varphi}{2}\right)^2$$

If the image angle is small in itself, for instance 60° and less, the oblique incidence of light is of relatively small importance so that in this case one may calculate with an approximate proportionality of the action of the light and the $$\left(\tan \frac{\varphi}{2}\right)^2$$

If for instance $$\varphi = 60° \text{ or } \frac{\varphi}{2} = 30°,$$

then $$\left(\tan \frac{\varphi}{2}\right)^2 = 0.58^2 = 0.337$$

If on the contrary $\varphi$ is only 40°, that is to say $$\frac{\varphi}{2} = 20°,$$

then $$\left(\tan \frac{\varphi}{2}\right)^2 = 0.365^2 = 0.13$$

In the latter case the action of light is therefore, without considering the angle of incidence, about one third as great as in the first case.

By using a diaphragm which obscures and shields from lateral light, according to the invention, a weakening of light is accordingly obtained which is determined (1) by the reduction of the surface acted upon, (2) by the dimensions of the tubular diaphragm.

This total action can be determined by experiments or by calculation, in such a manner that it will change the range of measuring of the apparatus, that is to say of an exposure meter, in a given proportion, for instance 1:20, 1:50 and so on.

In determining by calculation, in the case of large angles of image it is necessary to take into account the cosine action by a corresponding sub-division of the total area into annular surfaces $c_1, c_2 \ldots$ calculating with the mean angle of incidence of the various annular surfaces, for instance $\varphi_1$.

Figures 5 and 6 show the mounting of the diaphragm in a photoelectric exposure meter. Figure 6 is a longitudinal section through the central axis of Figure 5. In the housing of the exposure meter, in its upper part, is arranged the photoelectric element $f$ on which the light falls through the protective glass $g$ and the light admission tubular aperture $i$. In the lower part is arranged the direct current meter, the needle $m$ and scale $n$ of which can be observed through the window $o$. In front of the photoelectric element can be rotated the diaphragm $a$ which is rotatably mounted on the spindle $e$ and can be turned by means of the handle $k$. $a$ indicates the turned-in, and $a'$ the turned-out position. As may be seen from Figure 6, in the turned-out position the tubular projection $b$ of the diaphragm is directly above the magnet $p$ of the direct current meter, whilst the diaphragm $a$ is between the scale $n$ and the magnet $p$. This compact construction is rendered possible owing to the fact that the diaphragm aperture and the tubular projection $b$ are arranged according to the invention at the upper or leading edge of the surface of the diaphragm.

We claim:

A photoelectric exposure meter comprising a photoelectric element, a direct current measuring instrument, a casing for said element and measuring instrument, and a diaphragm for alteration of the range of measurement, said diaphragm being pivotally mounted in said casing on a shaft, said shaft provided with an external handle, by which said diaphragm may be brought alternatively to a position in front of or aside from the sensitive surface of said element, said diaphragm having an aperture and around said aperture a tubular projection, said aperture and said tubular projection being arranged at that edge of the diaphragm surface, which is the leading edge during the turning of the diaphragm to the position in front of said element.

ALBRECHT BERNHARD.
GUIDO BEYRICH.